Patented Sept. 6, 1932

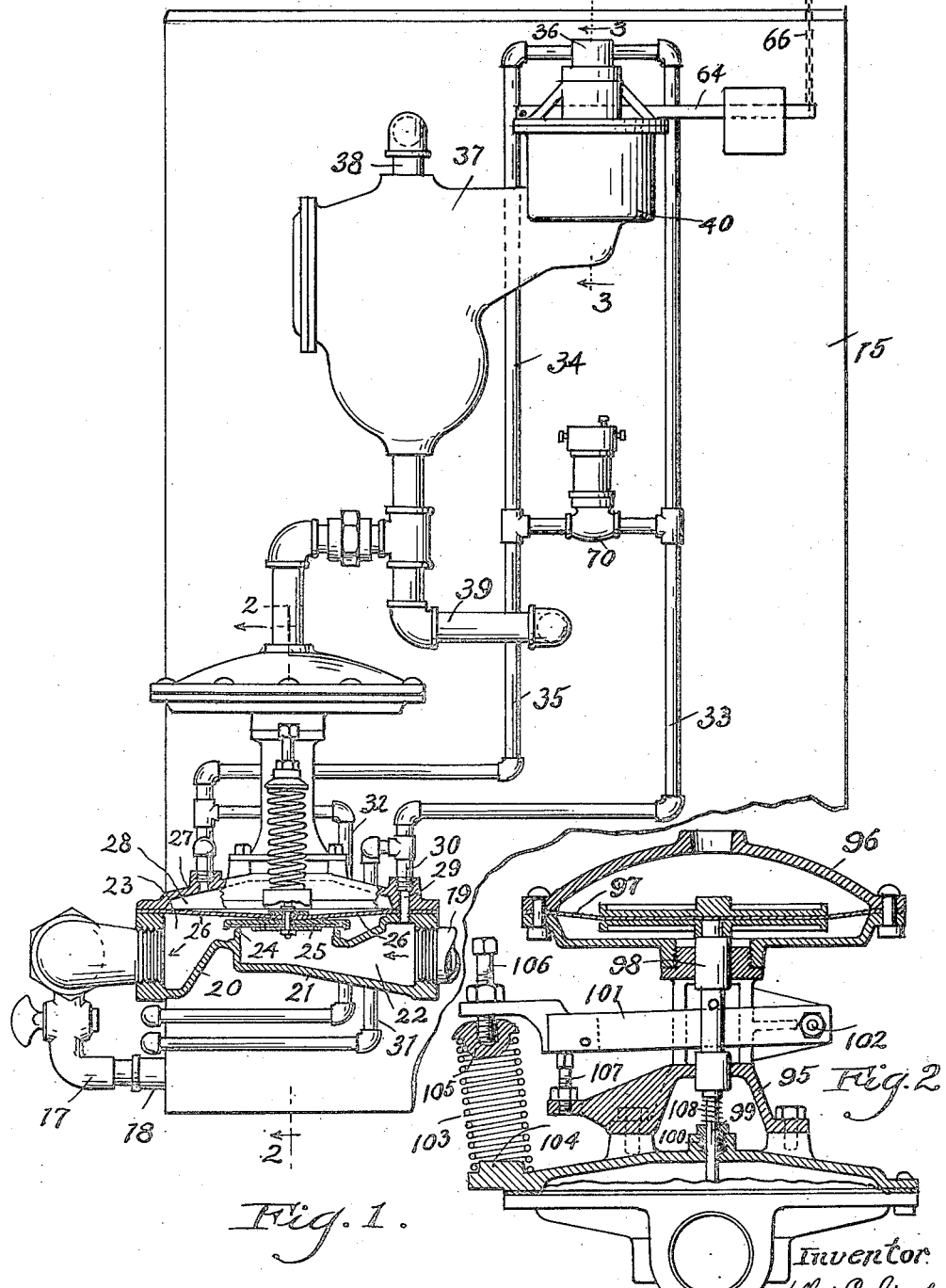

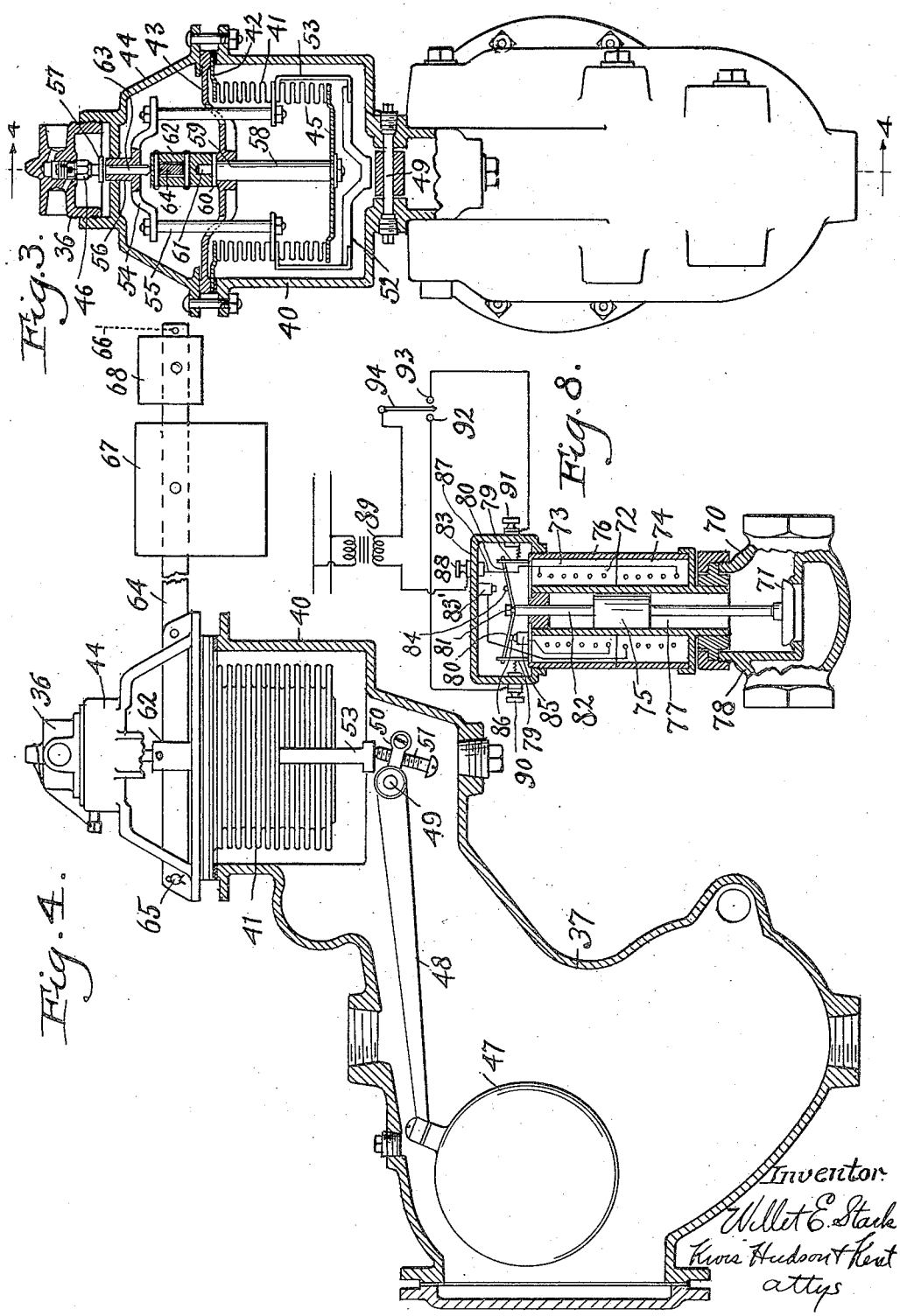

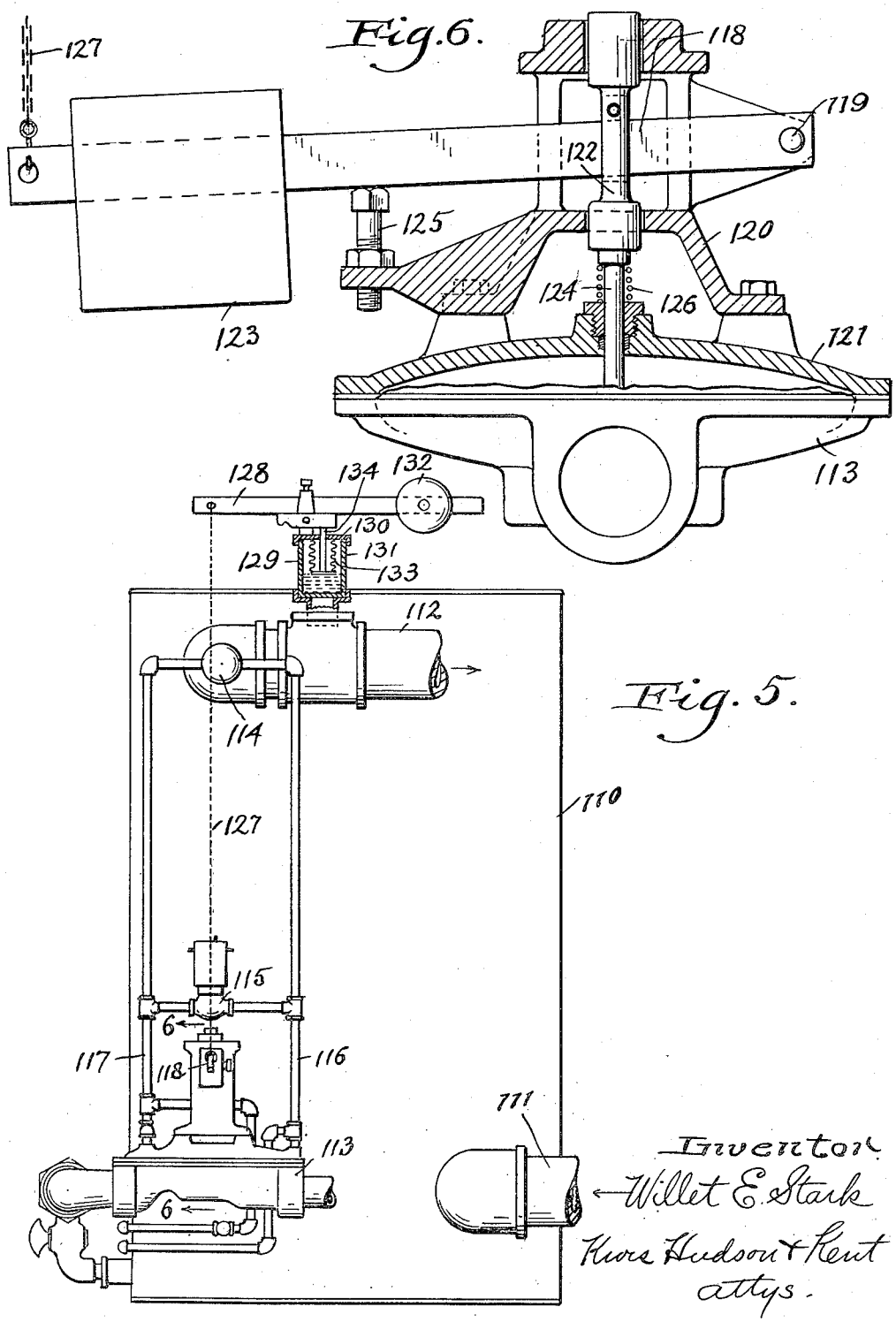

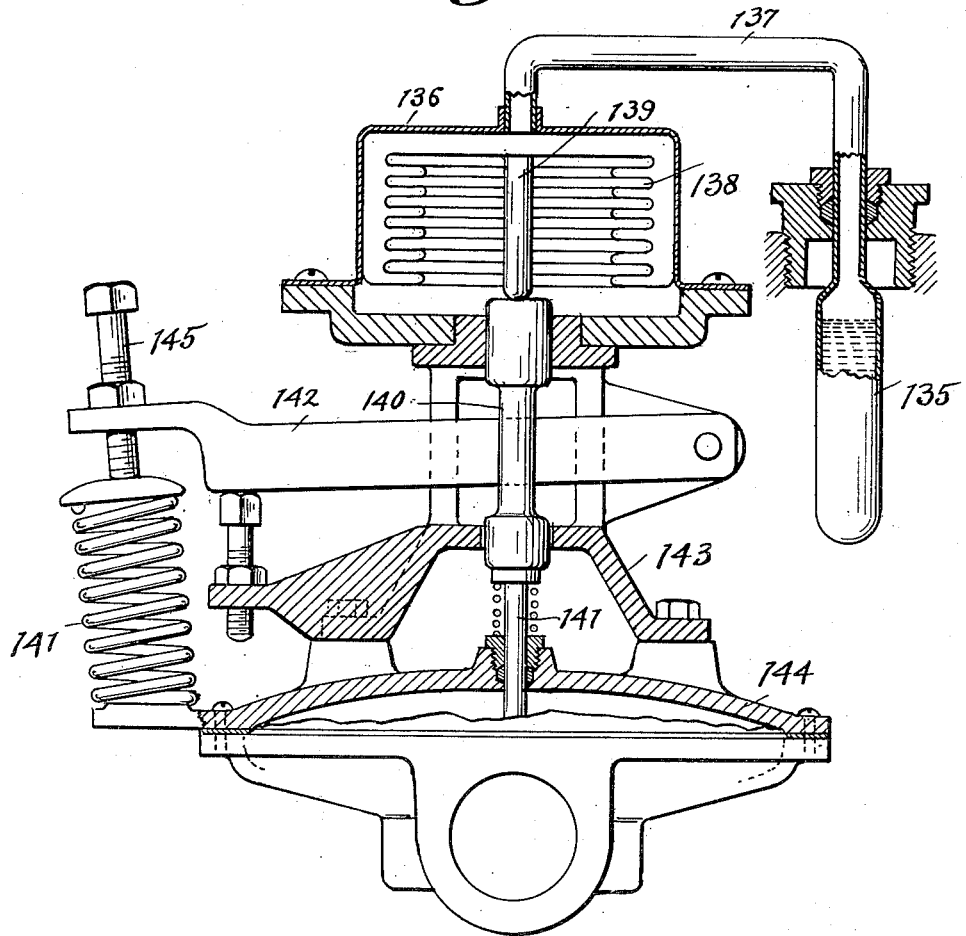

1,875,947

UNITED STATES PATENT OFFICE

WILLET E. STARK, OF EAST CLEVELAND, OHIO, ASSIGNOR TO THE BRYANT HEATER & MANUFACTURING COMPANY, OF CLEVELAND, OHIO, A CORPORATION OF OHIO

CONTROL SYSTEM FOR BOILERS AND THE LIKE

Application filed September 30, 1929. Serial No. 396,279.

This invention relates generally to heating apparatus, and more particularly to apparatus of this nature having an improved form of fuel control system for automatically varying the supply of fuel to the burners in response to changes in conditions within the boiler, or in response to changes taking place within the chamber heated by the apparatus.

Heretofore, in fuel control systems for apparatus of this type, it has been customary to control the flow of fuel to the burners, and thus control the boiler temperature and pressure, by intermittently opening and closing a valve in the supply line leading to the burners. When the temperature and pressure of the boiler are controlled in this manner, the flow of fuel to the burners is completely cut off for those intervals of time during which the temperature or pressure of the boiler remains at or above a predetermined limit; and during those intervals of time while the boiler temperature or pressure is below this limit a full flow of fuel is supplied to the burners. When the fuel supply to the burners is intermittently cut off in this manner, the temperature and pressure within the boiler cannot be maintained uniform, but must necessarily fluctuate between certain limits.

It is, therefore, an object of this invention to provide an automatic fuel control system in which the supply of fuel to the burners of heating apparatus is gradually varied in response to changes in boiler temperature or pressure, or in response to changes in room temperature, and is ultimately cut off by means actuated when the temperature, pressure or water level within the boiler, or temperature of the room heated, reaches a predetermined value.

Another object of this invention is to provide automatic fuel control means for gradually varying the supply of fuel to the burners of heating apparatus in response to temperature or pressure changes within the boiler.

Still another object of this invention is to provide an automatic fuel control system for heating apparatus, in which the flow of fuel to the burners of the apparatus is gradually varied in response to changes in the temperature of the fluid heated in the apparatus, and is ultimately cut off or restored in response to changes in the temperature of the fluid heated by the apparatus, or by changes in the room temperature.

A further object of this invention is to provide an automatic fuel control system for fluid heating apparatus, in which means is provided for gradually varying the supply of fuel to the burners in response to changes in the temperature of the fluid heated.

The invention may be further briefly summarized as consisting in certain novel combinations and arrangements of parts hereinafter described and set out in the appended claims.

In the accompanying sheets of drawings—

Fig. 1 is a side elevational view showing the apparatus of my invention with parts thereof broken away;

Fig. 2 is a sectional view taken on line 2—2 of Fig. 1;

Fig. 3 is a sectional view taken on line 3—3 of Fig. 1;

Fig. 4 is a sectional view taken on line 4—4 of Fig. 3;

Fig. 5 is a side elevational view showing another form of heating apparatus embodying my invention;

Fig. 6 is a sectional view taken on line 6—6 of Fig. 5;

Fig. 7 is an elevational view, partly in section, showing another form of fuel control apparatus embodying my invention; and Fig. 8 is a detail sectional view of an electrically actuated control valve.

Referring now in detail to the drawings illustrating my invention, I have shown in Fig. 1 an arrangement of heating apparatus which may form a part of a steam heating system for structures of various kinds. This heating apparatus comprises a gas fired boiler represented at 15, and a control system for the fuel supplied to the burners of the boiler for generating the steam which is delivered to the heating system. The boiler is provided with a manifold 16 from which gas is delivered through the cocks 17 to the burners 18. Gas is supplied to the manifold by means of a supply pipe 19, and this supply of gas is regulated and controlled by means of a diaphragm valve represented generally at 20. This diaphragm valve, as shown in Fig. 1, comprises a casing 21 having an inlet passage or chamber 22, and an outlet passage or chamber 23 which delivers the gas to the manifold 16. At the inner end of the inlet passage a valve seat 24 is provided, with which a disc valve 25 cooperates to control the flow of gas through the passages of the valve casing. The disc valve 25 is carried by a flexible diaphragm 26 which is clamped between the valve casing 21 and the cover 27. The cover 27 is so constructed as to provide a chamber 28 between the cover and the diaphragm. Adjacent the outer end of the inlet passage 22, aligned openings are formed in the valve casing, the diaphragm and the cover to provide a continuous passage 29 through these parts which communicates with the inlet passage 22, so that a portion of the gas supplied to the diaphragm valve can be diverted through this passage and delivered to the pipe 30 connected thereto.

Within the combustion chamber of the boiler and positioned adjacent the main burners, I provide one or more pilot burners to which gas is supplied from the pipe 30 by means of the branch pipe 31. In addition to the pilot burners, I provide an escapement burner adjacent the main burners, which is supplied with gas from the chamber 28 by the pipe 32 to thereby relieve the gas pressure above the diaphragm to permit the disc valve 25 to be opened, as will be more fully described hereinafter.

The flow of gas to the burners of the boiler is controlled by the action of the diaphragm 26, which moves the disc valve 25 carried thereby, relative to the valve seat 24, so as to vary the size of the valve opening. For the purpose of actuating the diaphragm to close the valve 25, a portion of the gas supplied by the pipe 19 is diverted through the piping 33, 34 and 35 and delivered into the chamber 28 where it exerts pressure upon the diaphragm. This diversion of gas to the chamber 28 above the diaphragm is controlled by a valve mounted in the casing 36, which valve is actuated in response to changes in pressure and water level within the boiler, and also in response to changes in room temperature.

Conveniently located adjacent the boiler 15 I have provided a float chamber 37 which is connected to the steam space of the boiler by means of the pipe 38, and is also connected to the boiler below the water level by means of piping 39. Changes in water level within the boiler are communicated to the float chamber so that the water level within the chamber always corresponds with the level of the water within the boiler. The upper end of the float chamber is shaped to provide the auxiliary chamber 40 which is in open communication with the float chamber and the steam space of the boiler. A flexible bellows 41 is suspended in the auxiliary chamber 40 by clamping the laterally extending annular ring 42, to which the upper end of the bellows is secured, between the upper edge of the auxiliary chamber and the outer rim of the plate 43. Pressure is applied to the rim of the plate 43 by the flange of the cover 44 which is bolted to the auxiliary chamber. The outer surface of the bellows and of the plate 45, which forms the bottom of the bellows, is subjected to boiler pressure, while the inner surface of the bellows and of the plate is exposed to atmospheric pressure. The upper end of the cover 44 is provided with a recess in which is mounted the valve casing 36. A valve unit 46 is secured in the casing 36 and is actuated to control the flow of gas to the chamber 28, in a manner which will be presently described.

For actuating the valve unit 46 in response to changes in the water level within the boiler, I provide a float 47 within the float chamber 37. This float is rigidly connected to one end of the lever 48 which is pivotally mounted at its opposite end upon a shaft 49 supported by the walls of the float chamber. At the pivoted end of the lever a relatively short extension 50 is provided, which carries a contact screw 51 adjustably mounted thereon for contact with the lower end of a yoke 52. The yoke 52 is provided with opposed arms 53 which extend upwardly outside of the bellows and are connected at their upper end to the bellows at approximately the midpoint of its length. For transmitting motion from the yoke 52 to the valve unit 46 I provide a yoke 54 having opposed arms 55 which extend through the plate 43 into the interior of the bellows and are connected thereto at the point of connection between the arms 53 and the bellows. At its upper end the yoke 54 is provided with a cylindrical portion 56 which is guided in, and extends through, an opening in the upper wall of the cover 44. This cylindrical portion is adapted to contact with the push button 57 of the valve unit 46 for actuating this unit.

It will now be readily seen that when the water level within the boiler and within the float chamber falls, due to increased steam consumption, the float 47 drops, causing the lever 48 to be swung downwardly upon its pivot. This movement of the lever swings the contact screw 51 upwardly which moves the yoke 52 upwardly. The upward movement of the yoke 52 is transmitted to the yoke 54 causing the push button to be moved upwardly by the cylindrical portion 56 to open the gas passage through the casing 36. The opening of this passage permits gas to flow into the chamber 28 to close the diaphragm valve opening by pressing the disc valve 25 downwardly. Thus, when the water level falls below a predetermined level, the gas supply to the burners is cut off, and when the water level again rises the float is elevated thereby, permitting the yoke 54 to move downwardly, which allows the valve unit 46 to close the passage through the casing 36. The gas pressure within the chamber 28 is relieved by the escape of the gas through the pipe 32 to the escapement burner, which permits the pressure of the gas supply to open the disc valve 25.

It has already been stated that the valve unit 46 may also be actuated in response to changes in boiler pressure, and for this purpose I provide the rod 58 which is connected centrally of the plate 45 and is guided at its upper end in the bearing portion 59 formed centrally of the plate 43. The upper end of this rod is formed with a collar 60, and an extension 61 of reduced diameter, above the collar. The extension 61 is received in a recess in the connecting member 62 while the collar abuts against the bottom of this member. The top of the connecting member is adapted to contact with the lower end of the slidable pin 63 which extends through a bore provided in the cylindrical portion 56 for engagement with the push button of the valve unit 46.

From this arrangement it will readily be seen that when boiler pressure increases, the bellows 41 is compressed upwardly, which moves the rod 58 upwardly. The upward movement of this rod is transmitted through the connecting member to the pin 63 which actuates the push button to open the gas passage through the casing 36. Thus an increase in boiler pressure above a predetermined value causes the supply of gas to the burners to be cut off until this pressure has been reduced.

The valve unit 46 may also be actuated in response to changes in room temperature, and for this purpose I provide a lever 64 which extends through the connecting member 62 and is pivoted at one end to the cover 44 as indicated at 65. The opposite end of the lever is connected by means of a chain 66, or other flexible connection, to a thermostatic device (not shown) located in a room heated by the system. Suitable sliding adjusting weights 67 and 68 may be provided on the lever for movement longitudinally thereof. When the room temperature increases above a predetermined value the chain 66 raises the lever 64 and the connecting member 62, causing the pin 63 to actuate the push button of the valve unit to open the passage through the casing 36. Thus an increase in room temperature above a definite value will cause the supply of gas to the burners of the boiler to be cut off.

In some installations it may be found desirable to supplement the control afforded by the lever 64 and the thermostatic device which actuates this lever with an electrically actuated control device 70 which is operated in response to changes in room temperature. In other installations it might be found advisable to utilize this electrically actuated control device in place of the lever 64 and the thermostatic device associated therewith. This control device comprises a valve 71 which is actuated in response to changes in room temperature to cause the gas supply to the burners to be cut off in the manner described in connection with the valve unit 46. For actuating the valve 71 I provide a solenoid 72 having separate windings 73 and 74 which are adapted to be separately energized for moving the armature 75 to which the valve is rigidly attached. The windings are housed in the chamber 76, which is provided with a central bore 77 for the movable armature and is mounted upon the valve casing 78. The winding 73 is placed at the upper end of the chamber and when energized lifts the armature upwardly, which raises the valve 71 off of its seat. The winding 74 is placed at the lower end of the chamber and when energized draws the armature downwardly which causes the valve 71 to engage its seat.

In order that the valve 71 may be moved quickly and may be retained in the open or closed position to which it has been moved by the solenoids, I have provided an arrangement of parts which permits the armature to be moved with a snap action. Various snap action mechanisms are available for this purpose, but in the arrangement illustrated opposed laterally flexible arms 79 extend upwardly from the solenoid casing 76. A pair of swinging arms 80 are arranged with their remote ends hinged to the upper ends of the flexible arms 79, and with their adjacent ends in engagement with an annular groove 81 provided at the upper end of extension 82 carried by the solenoid. In Fig. 8 of the drawings the armature 75 is shown at the end of its downward travel and the valve 71 is shown in closed position. As the armature is moved upwardly to open the valve, the swinging arms 80 approach a straight line position and thereby flex the arms 79 by wedging them apart. After the arms 80 pass the straight line position the resiliency of the arms 79 assists the upward movement of the armature until these arms have returned to their normal position. This action takes place with each stroke of the armature, and at the end of each stroke the armature is held by the snap action mechanism until the next stroke begins.

The snap action mechanism is housed within the cover 83 which is secured to the upper end of the solenoid casing. A contact point 83' depending from the top wall of the cover 83 is connected to the upper end of the lower solenoid winding 74, and cooperates with the movable contact point 84 carried on one of the swinging arms 80. A contact point 85 extending upwardly from the solenoid casing is connected to the lower end of the upper solenoid winding 73, and cooperates with a movable contact point 86 carried by the other swinging arm 80. The upper end of the upper solenoid 73 and the lower end of the lower solenoid 74 are connected to a common conductor 87 which leads to the binding post 88 which in turn is connected to a suitable source of electrical energy, such as the transformer 89. Energizing current may be supplied to the solenoid 73 while the points 85 and 86 are in contact, by means of a connection leading from the binding post 90 to the arm 79 which is electrically connected with the point 86. Likewise, energizing current may be supplied to the solenoid 74, while the points 83' and 84 are in contact, by means of the binding post 91, which is electrically connected with the arm 79 and the point 84. Thus it will be seen that when the valve is in the closed position, current can be supplied only to the opening solenoid 73, and when the valve is open current will be supplied only to the closing solenoid 74.

For controlling the supply of current to these solenoids I have shown diagrammatically a thermostatic device which is located in a room heated by the system. This device is of a well known form of construction comprising essentially two spaced contact points 92 and 93 and a bimetallic contact member 94 adapted to engage one or the other of these points. The points 92 and 93 are connected respectively with the posts 90 and 91, while the member 94 is connected with the transformer 89. When the room temperature rises and exceeds a predetermined limit, the member 94 is deflected into engagement with the point 92 which closes the circuit including the solenoid 73 and causes the valve to be opened, and at the same time moves the point 84 into engagement with the point 83'. The opening of the valve permits gas to be diverted to the chamber 28 to close the disc valve 25 and cut off the supply of gas to the burners. When the room temperature falls below a certain limit the member 94 engages the point 93 closing the circuit, which includes the solenoid 74, causing the valve 71 to be closed. The closing of the valve 71 cuts off the flow of gas to the chamber 28 and permits the diaphragm valve to be opened to again supply gas to the burners.

The fuel control system, as thus far described, operates to completely cut off the supply of fuel to the burners during intervals when the water level is low or when the boiler pressure is above a predetermined limit, or when room temperature is above a predetermined limit. In addition to the fuel control apparatus thus far described, I have provided other control apparatus by which the supply of gas to the burners may be gradually varied in response to different boiler or room conditions. This additional control apparatus, as shown in Figs. 1 and 2, comprises a device by means of which changes in boiler pressure act upon the disc valve 25 so as to gradually vary the valve opening as the boiler pressure changes. This device comprises a frame piece 95 which is supported upon the diaphragm valve cover 27 and which, in turn, supports a diaphragm chamber 96. The diaphragm chamber 96 is connected to the pipe 39 which leads to the water space of the boiler, whereby boiler pressure is delivered into the diaphragm chamber above the diaphragm 97 secured therein. An actuating rod 98 is slidably mounted in the frame piece and is connected at its upper end to the diaphragm 97 so that movements of the diaphragm cause the rod 98 to be reciprocated. The lower end of the rod 98 bears against the upper end of a plunger 99 which extends through the stuffing box 100 into the pressure chamber 28 of the diaphragm valve and engages the upper surface of the diaphragm 26 in alignment with the disc valve 25. As the pressure gradually increases within the boiler and within the chamber 96, the diaphragm 97 is deflected downwardly moving the rod 98 downwardly, thereby pressing the plunger 99 against the diaphragm 26 causing the valve 25 to be gradually moved toward the seat 24 which causes the flow of gas through the diaphragm valve to be reduced.

Under normal operating conditions it is desirable that no downward pressure be exerted upon the diaphragm 26 by the rod 98 and the plunger 99 and, therefore, to compensate for the normal boiler pressure which bears against the diaphragm 97 I have provided a lever 101 which is connected at one end thereof to the frame piece 95 by means of the pivot 102. This lever extends through an opening provided in the rod 98 so that reciprocation of this rod transmits swinging movement to the lever. Downward movement of the lever is opposed by the spring 103 which is arranged with its lower end in engagement with the boss 104 and its upper end in engagement with the spring retainer 105 which is adjustably connected to the free end of the lever by means of the adjusting screw 106. The screw 107 is adjustable in the direction of travel of the lever and serves as a stop for limiting the downward movement of the lever.

By means of the adjusting screw 106 the initial compression of the spring 103 can be set to compensate for normal boiler pressure on the diaphragm 97 so that under normal operating conditions only slight movement is transmitted to the plunger 99 which is held out of engagement with the diaphragm 26 by means of the spring 108. But upon abnormal increase in boiler pressure there is a further downward movement of the lever, which causes the plunger 99 to gradually press the valve 25 toward the seat 24. Thus it will be readily seen that this additional control apparatus causes the supply of gas to the burners to be gradually reduced as the boiler pressure rises above a predetermined value, so that a steady flow of gas will be supplied to the burners at the proper rate to maintain substantially constant boiler pressure.

In Fig. 5 of the drawings I have shown a heating unit 110 forming a part of a system such as a hot water or hot air heating system. Fluid to be heated is supplied to this unit by the pipe 111 and after being heated is conveyed away from the unit to the desired places by the pipe 112. Gas is supplied to the burners of the unit by means of a diaphragm valve 113 which may be similar in construction to the diaphragm valve shown in Fig. 1, and actuated in a similar manner. For controlling the actuation of the diaphragm valve, so that the flow of gas to the burners will be cut off when the temperature of the fluid leaving the boiler reaches a predetermined limit, or when the room temperature reaches a predetermined limit, I provide a thermally operated valve 114 mounted on the fluid discharge pipe 112, and an electrically actuated valve 115 which is connected with a thermostatic device of the type shown in Fig. 8. These valves are connected in the gas line 116 and 117 which supplies gas pressure to the chamber above the diaphragm of the diaphragm valve 113, in the manner already described in connection with the operation of the apparatus shown in Fig. 1.

For gradually reducing the flow of gas to the burners when the temperature of the fluid leaving the heating unit rises above a predetermined limit, I provide a lever 118 which is secured at one end thereof by means of a pivot 119, to a frame 120 carried by the cover 121 of the diaphragm valve 113. The lever 118 passes through a rod 122 which is slidable in the frame so as to be reciprocated by the lever when the latter is swung up or down. A weight 123, which is slidable longitudinally of the lever, tends to move the latter and the rod 122 downwardly. Downward movement of the rod is transmitted to a plunger 124 which presses against the diaphragm of the diaphragm valve to gradually reduce the valve opening and thereby diminish the flow of gas to the burner. The extent of downward movement permitted the lever may be varied by the adjusting screw 125, and the plunger 124 is normally held away from the diaphragm by the spring 126.

The lever 118 is adapted to be raised and lowered by means of a chain 127 which connects the free end of this lever to one end of the lever 128 of the thermostatic device 129 mounted on the delivery pipe 112. The lever 128 is pivotally supported on the cover 130 of the casing 131, and is provided with a slidable counterweight 132. A flexible bellows 133 extending into the casing is provided with a rod 134 which engages the lever 128 adjacent its pivot point. The thermostatic device is mounted upon the delivery pipe 112 and contains a volatile liquid which is adapted to be vaporized by the heat of the fluid passing through the pipe. When the temperature of fluid in this pipe is above a predetermined value the vaporization of this volatile fluid exerts a pressure upon the bellows in a well-known manner causing the lever 128 to be swung about its pivot, thus lifting the counterweighted end of this lever and depressing the end which is connected to the lever 118 by means of the chain. Thus it will be seen that an increase in temperature above a definite value, of the fluid flowing through the pipe 112, will permit the weight 123 to move the lever 118 downwardly about its pivot which moves the rod 122 downwardly and, in turn, presses the plunger 124 against the diaphragm of the diaphragm valve to reduce the flow of gas to the burners. If the temperature of the room heated rises above a predetermined value, the valve 115 will be opened to permit gas to be diverted to the chamber of the diaphragm valve, which will cause the supply of gas to be cut off. Likewise, the valve 114 will be opened if the temperature of the fluid in the pipe 112 continues to rise thereby causing the supply of gas to be cut off.

In Fig. 7 of the drawings I have shown another form of fuel control system embodying my invention, which may be used in connection with fluid heating apparatus such as water or air heaters of various types. This control apparatus differs from the control apparatus illustrated in Fig. 1, primarily, in that the force, which acts to gradually close the diaphragm valve, is derived from pressure generated within a part of the control apparatus when the temperature of the fluid heated exceeds a certain value. This pressure is generated by the vaporization of a volatile fluid contained in a bulb 135 which is inserted into the heater unit or fluid passage, and is transmitted to the casing 136 by the tube 137. A flexible bellows 138 is arranged within the casing so that pressure, generated by the heating of the fluid above a predetermined temperature, acting upon the outer surface of the bellows causes the rod 139 to move the rod 140 downwardly, which in turn moves the plunger 141 downwardly to reduce the diaphragm valve opening and thus gradually reduce the supply of gas to the burners.

In order that the flow of gas to the burners may not be diminished, due to the force exerted by the pressure generated in the casing 136 during the normal operation of the fluid heater, I provide a spring 141' which cooperates with the lever 142 to oppose this force. The lever 142 extends through an opening provided in the rod 140, and has one end pivoted on the frame member 143 which is supported on the diaphragm valve 144, while its opposite end engages the spring 141' by means of the adjusting screw 145. By this arrangement, it will be readily seen, the heating of the fluid above a predetermined temperature causes the valve opening of the diaphragm valve 144 to be gradually reduced, thus diminishing the flow of gas to the burners.

From the foregoing description, taken in conjunction with the drawings illustrating the apparatus of my invention, it will be readily understood that I have provided a fuel control system for heating apparatus, by which a more uniform boiler pressure and room temperature can be maintained, since the supply of gas to the burners is gradually varied in response to changes in boiler pressure. Further, it will be seen that when abnormal changes occur in the boiler temperature, the water level, or room temperature, the supply of gas to the main burners may be cut off entirely, so that normal boiler conditions and a normal room temperature can be quickly restored.

While I have shown and described the apparatus of my invention in a detailed manner, it should be understood, however, that I do not intend to limit my invention to the precise details shown and described, but regard my invention as including such changes and modifications as do not involve a departure from the spirit of the invention and the scope of the appended claims.

Having thus described my invention, I claim:

1. In a fuel control system for gas-fired heating apparatus, the combination of a valve for controlling the flow of gas to the burners, means for controlling the actuation of said valve whereby the flow of gas to the burners is adapted to be cut off when a predetermined limit of boiler pressure, water level or room temperature is reached, and other control means associated with said valve whereby said flow of gas is gradually reduced before one of said predetermined limits is reached.

2. In a fuel control system for gas-fired heating apparatus, the combination of a valve for controlling the flow of gas to the burners, means for controlling the actuation of said valve whereby the flow of gas to the burners is adapted to be cut off when a predetermined limit of boiler pressure, water level or room temperature is reached, and other control means associated with said valve whereby said flow of gas is gradually reduced before one of said predetermined limits is reached, said other control means being responsive to changes in boiler pressure.

3. In a fuel control system for gas-fired heating apparatus, the combination of a gas supply, a diaphragm valve for controlling the flow of gas to the burners, means for diverting a portion of said gas supply for actuating said valve to quickly close the same when a predetermined limit of boiler pressure, water level or room temperature is reached, and means for gradually closing said valve before one of said predetermined limits is reached.

4. In a fuel control system for gas-fired heating apparatus, the combination of a gas supply, a diaphragm valve for controlling the flow of gas to the burners, means for diverting a portion of said gas supply for actuating said valve to quickly close the same when a predetermined limit of boiler pressure, water level or room temperature is reached, and actuating means responsive to boiler pressure for gradually closing said valve before the predetermined limit of boiler pressure is reached.

5. In a fuel control system for fluid heating apparatus, the combination of a gas supply, a diaphragm valve for controlling the flow of gas to the burners, actuating means adapted to intermittently move said valve to open and closed positions, and other means for gradually varying the opening of said valve comprising means for applying pressure to said actuating means substantially in proportion with the temperature of the fluid heated by the apparatus, and means for opposing the action of said pressure applying means whereby said actuating means is moved by said pressure applying means to gradually reduce the valve opening when the temperature of the fluid heated exceeds a predetermined value and said actuating means is moved by said opposing means to permit the valve opening to be gradually increased when the temperature of the fluid is below a predetermined value.

In testimony whereof, I hereunto affix my signature.

WILLET E. STARK.